US012662019B2

(12) United States Patent
Lian et al.

(10) Patent No.: US 12,662,019 B2
(45) Date of Patent: Jun. 23, 2026

(54) VEHICLE BATTERY THERMAL MANAGEMENT SYSTEM, VEHICLE THERMAL MANAGEMENT SYSTEM, AND ELECTRIC VEHICLE

(71) Applicant: BYD COMPANY LIMITED, Shenzhen (CN)

(72) Inventors: Yubo Lian, Shenzhen (CN); Heping Ling, Shenzhen (CN); Yong Xiong, Shenzhen (CN); Gan Song, Shenzhen (CN); Yili Luo, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 701 days.

(21) Appl. No.: 18/018,252

(22) PCT Filed: Jul. 26, 2021

(86) PCT No.: PCT/CN2021/108444
§ 371 (c)(1),
(2) Date: Jan. 26, 2023

(87) PCT Pub. No.: WO2022/022463
PCT Pub. Date: Feb. 3, 2022

(65) Prior Publication Data
US 2023/0294557 A1      Sep. 21, 2023

(30) Foreign Application Priority Data
Jul. 28, 2020    (CN) ........................ 202010738220.X

(51) Int. Cl.
*B60L 58/26* (2019.01)
*B60L 58/27* (2019.01)

(52) U.S. Cl.
CPC ............... *B60L 58/26* (2019.02); *B60L 58/27* (2019.02)

(58) Field of Classification Search
CPC ...... B60L 58/26; B60L 58/27; B60L 2240/34; B60L 1/003; B60H 2001/00307;
(Continued)

(56) References Cited

U.S. PATENT DOCUMENTS 7,789,176 B2 * 9/2010 Zhou ................... B60H 1/00885
180/65.1
9,533,551 B2 * 1/2017 Cheng ................... B60H 1/2221
(Continued)

FOREIGN PATENT DOCUMENTS

CA        2778026 A1 * 11/2012  ............. B60H 1/143
CN    102315498 A      1/2012
(Continued)

OTHER PUBLICATIONS

International Search Report and Written Opinion for Application No. PCT/CN2021/108444, mailed on Oct. 28, 2021, 9 pages.
(Continued)

*Primary Examiner* — M Baye Diao
(74) *Attorney, Agent, or Firm* — Sheppard Mullin Richter & Hampton LLP

(57)        ABSTRACT

A vehicle battery thermal management system includes a heat conducting element connected to a vehicle air conditioning system and a self-heating circuit connected to a vehicle power battery. The heat conducting element, a compressor of the vehicle air conditioning system, and an outdoor condenser of the vehicle air conditioning system form a battery refrigeration loop, and the battery refrigeration loop absorbs heat from the vehicle power battery through a refrigerant in the heat conducting element to cool down the vehicle power battery. The self-heating circuit and the vehicle power battery form a battery self-heating loop, and the self-heating circuit is configured to control the vehicle power battery to perform high-frequency alternating
(Continued)

charging and discharging for self-heating in the battery self-heating loop.

13 Claims, 2 Drawing Sheets

(58) Field of Classification Search
CPC ............ B60H 1/00278; B60H 1/00921; B60H 1/3228; B60H 1/323; B60H 1/00392; B60H 1/03; B60H 1/32281; H01M 2220/20; H01M 10/613; H01M 10/615; H01M 10/625; H01M 10/635; H01M 10/637; H01M 10/6554; H01M 10/6563; H01M 10/6568; H01M 10/6569; H01M 10/657; H01M 10/6571; H01M 10/663; H01M 10/667; H01M 50/249; Y02E 60/10; Y02T 10/70; B60Y 2200/91; F25B 2400/16
USPC ......................................................... 320/150
See application file for complete search history.

(56) References Cited

U.S. PATENT DOCUMENTS

| | | | | |
|---|---|---|---|---|
| 9,680,190 | B1 * | 6/2017 | Xia | .................... H01M 10/6557 |
| 10,933,712 | B2 * | 3/2021 | Lee | .................... B60H 1/32281 |
| 10,967,702 | B2 * | 4/2021 | Mancini | ............. B60H 1/00564 |
| 2012/0297809 | A1 | 11/2012 | Carpenter | |
| 2015/0266392 | A1 * | 9/2015 | Arai | .................... B60H 1/00278 |
| | | | | 320/150 |
| 2015/0318589 | A1 * | 11/2015 | Keating, I | ............. H01M 10/46 |
| | | | | 219/209 |
| 2019/0070924 | A1 * | 3/2019 | Mancini | ............. B60H 1/32281 |
| 2019/0152286 | A1 | 5/2019 | Lee et al. | |

FOREIGN PATENT DOCUMENTS

| | | | | | |
|---|---|---|---|---|---|
| CN | 102941791 | A | | 2/2013 | |
| CN | 104835994 | A | | 8/2015 | |
| CN | 105539067 | A | | 5/2016 | |
| CN | 104779652 | B | | 1/2017 | |
| CN | 106864201 | A | | 6/2017 | |
| CN | 107323285 | A | | 11/2017 | |
| CN | 107512149 | A | | 12/2017 | |
| CN | 108515875 | A | | 9/2018 | |
| CN | 207875410 | U | * | 9/2018 | ............. Y02E 60/10 |
| CN | 208522063 | U | | 2/2019 | |
| CN | 109489292 | A | | 3/2019 | |
| CN | 109641507 | A | | 4/2019 | |
| CN | 208931069 | U | | 6/2019 | |
| CN | 110224197 | A | | 9/2019 | |
| CN | 209426514 | U | | 9/2019 | |
| CN | 209426528 | U | | 9/2019 | |
| CN | 110739508 | A | | 1/2020 | |
| CN | 111231657 | A | | 6/2020 | |
| CN | 210680462 | U | | 6/2020 | |
| CN | 111376672 | A | | 7/2020 | |
| CN | 111404247 | A | | 7/2020 | |
| CN | 212230582 | U | * | 12/2020 | ............. Y02E 60/10 |
| CN | 112706578 | A | | 4/2021 | |
| EP | 3923398 | A1 | * | 12/2021 | ............. B60L 58/27 |
| GB | 2575546 | A | | 1/2020 | |
| JP | 2018-043741 | A | | 3/2018 | |
| JP | 2019-016584 | A | | 1/2019 | |
| JP | 2019217946 | A | | 12/2019 | |
| KR | 102111322 | B1 | | 5/2020 | |
| KR | 102277718 | B1 | | 7/2021 | |
| KR | 102518184 | B1 | | 4/2023 | |
| WO | WO-2020072441 | A1 | * | 4/2020 | .......... H01M 10/615 |

OTHER PUBLICATIONS

Extended European Search Report dated Jan. 23, 2024, issued in related European Patent Application No. 21850990.9 (9 pages).

First Search dated Jul. 1, 2021, issued in related Chinese Patent Application No. 202010738220.X (1 page).

Request for the Submission of an Opinion dated Jan. 17, 2025, issued in related Korean Patent Application No. 10-2023-7006988, with English machine translation (12 pages).

Written Decision on Registration dated Apr. 14, 2025, issued in related Korean Patent Application No. 10-2023-7006988, with English machine translation (10 pages).

Notice of Reasons for Refusal dated Feb. 20, 2024, issued in related Japanese Patent Application No. 2023-505883, with English machine translation (10 pages).

Decision to Grant a Patent dated Aug. 13, 2024, issued in related Japanese Patent Application No. 2023-505883, with English machine translation (5 pages).

* cited by examiner

Electric vehicle 20

Vehicle thermal
management system 10

VEHICLE BATTERY THERMAL MANAGEMENT SYSTEM, VEHICLE THERMAL MANAGEMENT SYSTEM, AND ELECTRIC VEHICLE

CROSS-REFERENCE TO RELATED APPLICATION

This application is a National Phase Application of International Patent Application No. PCT/CN2021/108444 filed with the China National Intellectual Property Administration (CNIPA) on Jul. 26, 2021, which is based on and claims priority to and benefits of Chinese Patent Application No. 202010738220.X, filed on Jul. 28, 2020. The entire content of all of the above-identified applications is incorporated herein by reference.

FIELD

The present disclosure relates to the field of vehicle thermal management technologies, and In an embodiment to a vehicle battery thermal management system, a vehicle thermal management system, and an electric vehicle.

BACKGROUND

With the rapid development of power battery technologies, more and more electric vehicles are used by people. The power battery is an important energy supply component of electric vehicles. The performance of electric vehicles is determined by the performance of the power battery to a great extent. In a battery thermal management system in the related art, generally two sets of thermal management pipelines are arranged in a battery pack of a vehicle power battery, one set of thermal management pipeline is used for the circulation of the refrigerant, and the other set is used for the circulation of the coolant. The battery pack in this solution is provided with complex pipelines, which not only increase the weight of the battery pack, but also increase the difficulty in the layout and production of the battery pack. Compared with direct cooling and self-heating of vehicle power batteries, the power battery in the related art has a poor heat resistance and a low-temperature resistance. In addition, in the related art, an external heat source is generally used to heat the power battery. However, the method of heating the power battery by the external heat source has a low heating efficiency, and the external heat source needs to be arranged in addition to the power battery, increasing the manufacturing costs of the power battery.

SUMMARY

The present disclosure solves the problems of the poor heat resistance, low-temperature resistance, and low heating efficiency of power batteries in the related art, and provides a vehicle battery thermal management system, a vehicle thermal management system, and an electric vehicle.

To solve the above problems, an embodiment of the present disclosure provides a vehicle battery thermal management system, including a heat conducting element connected to a vehicle air conditioning system and a self-heating circuit connected to a vehicle power battery, where the heat conducting element, a compressor of the vehicle air conditioning system, and an outdoor condenser of the vehicle air conditioning system form a battery refrigeration loop, and the battery refrigeration loop cools the power battery by absorbing heat from the power battery through a refrigerant in the heat conducting element; and the self-heating circuit and the power battery form a battery self-heating loop, and the power battery implements high-frequency alternating charging and discharging for self-heating through the self-heating circuit in the battery self-heating loop.

According to some embodiments of the present disclosure, the heat conducting element is a direct cooling plate integrated in the power battery.

An embodiment of the present disclosure further provides a vehicle battery thermal management system, including a vehicle air conditioning system and a vehicle battery thermal management system, where the vehicle air conditioning system includes a compressor, an outdoor condenser, and an evaporator; an outlet of the compressor is connected with an inlet of the outdoor condenser, and an outlet of the outdoor condenser is connected with an inlet of the evaporator and an inlet of the heat conducting element; an outlet of the evaporator and an outlet of the heat conducting element are connected with an inlet of the compressor; and the compressor, the outdoor condenser, and the evaporator form a passenger compartment refrigeration loop, and the passenger compartment refrigeration loop cools a passenger compartment through the evaporator arranged in the passenger compartment.

According to some embodiments of the present disclosure, the vehicle air conditioning system further includes a first expansion valve and a second expansion valve for reducing refrigerant pressure; an inlet of the first expansion valve and an inlet of the second expansion valve are both connected with the outlet of the outdoor condenser; and an outlet of the first expansion valve is connected with the inlet of the evaporator, and an outlet of the second expansion valve is connected with the inlet of the heat conducting element.

According to some embodiments of the present disclosure, the vehicle air conditioning system further includes an electronic fan installed on a vehicle body and opposite to the outdoor condenser.

According to some embodiments of the present disclosure, the vehicle air conditioning system further includes a liquid collector; an inlet of the liquid collector is connected with the outlet of the heat conducting element and the outlet of the evaporator; and an outlet of the liquid collector is connected with the inlet of the compressor.

According to some embodiments of the present disclosure, the vehicle air conditioning system further includes an indoor condenser, a first solenoid valve, and a third expansion valve; an inlet of the indoor condenser and an inlet of the first solenoid valve are both connected with the outlet of the compressor, and an outlet of the first solenoid valve is connected with the inlet of the outdoor condenser;

the compressor, the indoor condenser, the outdoor condenser, and the heat conducting element form a first passenger compartment heating loop; and the first passenger compartment heating loop absorbs heat from the power battery through a refrigerant in the heat conducting element and transfers the absorbed heat to the indoor condenser through the compressor, then heat the passenger compartment through the indoor condenser arranged in the passenger compartment.

According to some embodiments of the present disclosure, the vehicle air conditioning system further includes a second solenoid valve; an inlet of the second solenoid valve is connected with the outlet of the outdoor condenser, and an outlet of the second solenoid valve is connected with the inlet of the compressor; and the compressor, the indoor condenser, the third expansion valve, the outdoor condenser, and the second solenoid valve form a second passenger compartment heating loop, and the second passenger compartment heating loop heats the passenger compartment through the indoor condenser.

According to some embodiments of the present disclosure, the vehicle air conditioning system further includes a heater arranged on the vehicle body and configured to heat a vehicle passenger compartment.

An embodiment of the present disclosure further provides an electric vehicle, including the vehicle thermal management system.

In the present disclosure, the vehicle battery thermal management system includes the heat conducting element connected to the vehicle air conditioning system and the self-heating circuit connected to the vehicle power battery. When the temperature of the power battery is low, the power battery implements high-frequency alternating charging and discharging through the self-heating circuit in the battery self-heating loop for self-heating, so that the temperature of the power battery rises, and the power battery can operate in a low-temperature environment. In addition, the heat conducting element and the compressor and the outdoor condenser of the vehicle air conditioning system form the battery refrigeration loop. When the temperature of the power battery is high, the battery refrigeration loop absorbs heat from the power battery through the refrigerant in the heat conducting element to cool down the power battery, so that the power battery can operate in a high-temperature environment. Therefore, the vehicle battery thermal management system provided in the present disclosure can maintain the temperature of the power battery within an appropriate temperature range, which not only improves the heat resistance and low-temperature resistance of the power battery, but also improves the adaptability of the electric vehicle. In addition, the vehicle battery thermal management system of the present disclosure can realize self-heating of the power battery without an additional external heat source in the battery pack of the power battery, thereby reducing the manufacturing costs and weight of the power battery, and improving the energy utilization of the power battery.

BRIEF DESCRIPTION OF THE DRAWINGS

The present disclosure is further described below with reference to the accompanying drawings and embodiments.

Figure 1:
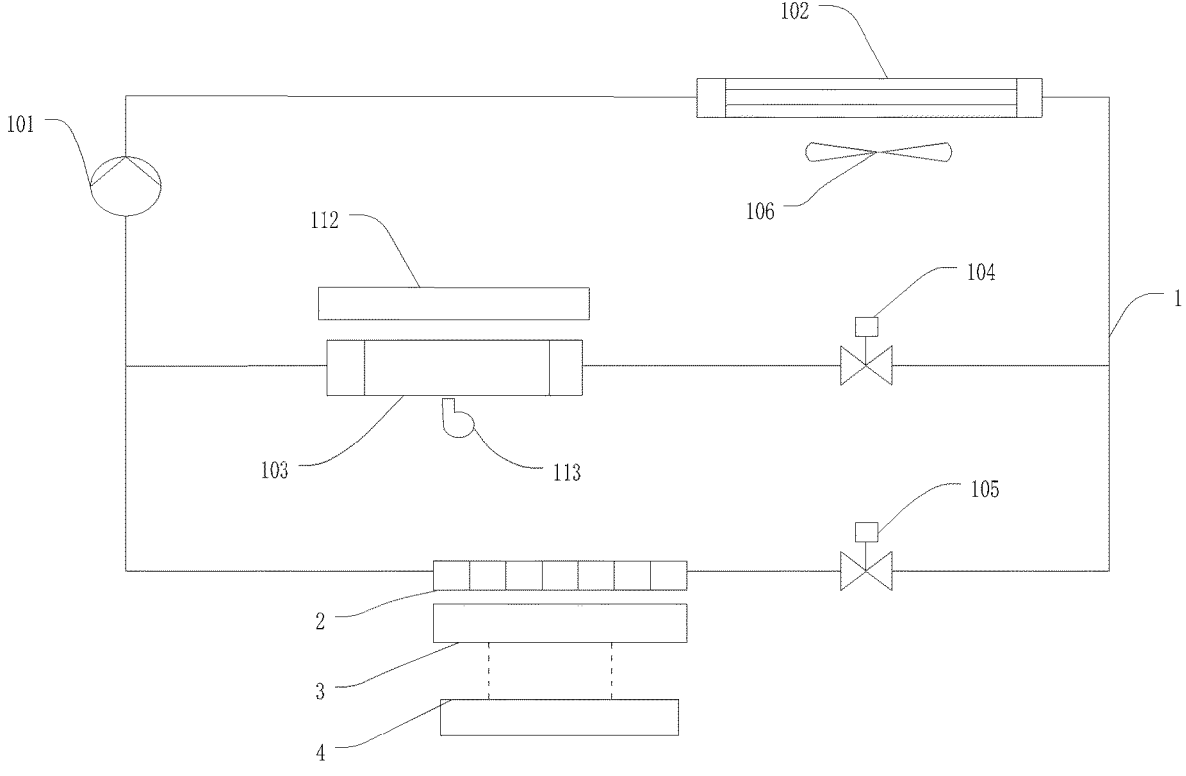
FIG. 1 is a schematic structural diagram of a vehicle thermal management system according to an embodiment of the present disclosure.

The reference numerals in the specification are as follow: vehicle air conditioning system 1; Compressor 101; outdoor condenser 102; evaporator 103; first expansion valve 104; second expansion valve 105; electronic fan 106; liquid collector 107; 108. indoor condenser 108; 109. first solenoid valve 109; third expansion valve 110; second solenoid valve 111; heater 112; blower 113; heat conducting element 2; power battery 3; self-heating circuit 4; vehicle thermal management system 10; and electric vehicle 20.

DETAILED DESCRIPTION

To make the technical problems to be solved by the present disclosure, technical solutions, and beneficial effects more comprehensible, the following further describes the present disclosure in detail with reference to the accompanying drawings and embodiments. It should be understood that the embodiments described herein are merely used for explaining the present disclosure, and are not to limit the present disclosure.

It should be understood that orientation or position relationships indicated by the terms such as "on", "below", "left", "right", "front", "rear", "top", and "central" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of the present disclosure.

As shown in FIG. 1, according to an embodiment of the present disclosure, a vehicle battery thermal management system includes a heat conducting element 2 connected to a vehicle air conditioning system 1, and a self-heating circuit 4 connected (electrically connected) to a vehicle power battery 3. The heat conducting element 2, a compressor 101 of the vehicle air conditioning system 1, and an outdoor condenser 102 of the vehicle air conditioning system 1 form a battery refrigeration loop, and the battery refrigeration loop absorbs heat from the power battery 3 through a refrigerant (including Freon, etc.) in the heat conducting element 2 to cool down the power battery 3. The self-heating circuit 4 and the power battery 3 form a battery self-heating loop, and the power battery 3 implements high-frequency alternating charging and discharging for self-heating through the self-heating circuit 4 in the battery self-heating loop. It can be understood that the heat conducting element 2 is connected with the power battery 3 through heat conducting materials, and a pipe for the refrigerant to flow is arranged in the heat conducting element 2, to facilitate the heat exchange between the power battery 3 and the refrigerant flowing through the pipe in the heat conducting element 2.

It can be understood that, the battery self-heating loop is a circuit module that can realize the high-frequency charging and discharging of the power battery 3. The circuit module includes energy storage elements such as a capacitor and an inductor. When the temperature of the power battery 3 is low, the power battery 3 first discharges to the energy storage elements in the battery self-heating loop. After discharging for a period of time, the polarity of the battery self-heating loop is reversed. In this case, the electrical energy stored in the energy storage elements charges the power battery 3. In the process of charging the power battery 3, the internal resistance of the power battery 3 heats up, so that the temperature of the power battery 3 rises. According to some embodiments of the present disclosure, the time of charging and discharging or the alternation of charging and discharging states of the power battery 3 is controlled by the order of on and off of switching elements in the battery self-heating loop.

In the present disclosure, the vehicle battery thermal management system includes the heat conducting element 2 connected to the vehicle air conditioning system 1 and the self-heating circuit 4 connected to the vehicle power battery 3. The self-heating circuit 4 and the power battery 3 form the battery self-heating loop. When the temperature of the power battery 3 is low, the power battery 3 implements the high-frequency alternating charging and discharging for self-heating through the self-heating circuit 4 in the battery self-heating loop, so that the temperature of the power battery 3 rises, and the power battery 3 can operate in a low-temperature environment. In addition, the heat conducting element 2, the compressor 101, and the outdoor condenser 102 of the vehicle air conditioning system 1 form the battery refrigeration loop. When the temperature of the power battery 3 is high, the battery refrigeration loop absorbs heat from the power battery 3 through the refrigerant in the heat conducting element 2 to cool down the power battery 3, so that the power battery 3 can operate in a high-temperature environment. Therefore, the vehicle battery thermal management system provided in the present disclosure can maintain the temperature of the power battery 3 within an appropriate temperature range, which not only improves the heat resistance and low-temperature resistance of the power battery 3, but also improves the adaptability of the electric vehicle. In addition, the vehicle battery thermal management system of the present disclosure can realize self-heating of the power battery 3 without an additional external heat source arranged in the battery pack of the power battery 3, thereby reducing the manufacturing costs and the weight of the power battery 3, and improving the energy utilization of the power battery 3.

In an embodiment, the heat conducting element 2 is a direct cooling plate integrated in the power battery 3. It can be understood that, the direct cooling plate is integrated in the battery pack of the power battery 3, and is in full contact with the surface of the power battery 3, to optimize the pipe in the battery pack of the power battery (where the direct cooling plate and the power battery 3 are both integrated in the battery pack) and make full use of the space in the battery pack of the power battery, thereby reducing the weight and manufacturing costs of the battery pack of the power battery.

As shown in FIG. 1, according to an embodiment of the present disclosure, a vehicle thermal management system includes a vehicle air conditioning system 1 and the vehicle battery thermal management system. The vehicle air conditioning system 1 includes a compressor 101, an outdoor condenser 102, and an evaporator 103. An outlet of the compressor 101 is connected with an inlet of the outdoor condenser 102, and an outlet of the outdoor condenser 102 is connected with an inlet of the evaporator 103 and an inlet of the heat conducting element 2. An outlet of the evaporator 103 and an outlet of the heat conducting element 2 are connected with an inlet of the compressor 101. The compressor 101, the outdoor condenser 102, and the evaporator 103 form a passenger compartment refrigeration loop, and the passenger compartment refrigeration loop cools a passenger compartment through the evaporator 103 arranged in the passenger compartment. It can be understood that the compressor 101, the outdoor condenser 102, the evaporator 103, and the heat conducting element 2 are all connected through pipes, and the pipes contains refrigerant (e.g., Freon, etc.). In an embodiment, the refrigerant changes from liquid to gas in the evaporator 103. During the phase change process, the refrigerant absorbs the heat from the passenger compartment, so as to provide a cooling effect on the passenger compartment. In the present disclosure, the vehicle thermal management system can not only cool down the power battery 3, but also cool the passenger compartment, thereby improving the applicability of the vehicle thermal management system.

In an embodiment, as shown in FIG. 1, the vehicle air conditioning system 1 further includes a blower 113 installed on a vehicle body and opposite to the evaporator 103. It can be understood that, cold air from the evaporator 103 can be blown into the passenger compartment, thereby further improving the comfort of the vehicle.

In an embodiment, as shown in FIG. 1, the vehicle air conditioning system 1 further includes a first expansion valve 104 and a second expansion valve 105 for reducing the refrigerant pressure. An inlet of the first expansion valve 104 and an inlet of the second expansion valve 105 are both connected with the outlet of the outdoor condenser 102. An outlet of the first expansion valve 104 is connected with the inlet of the evaporator 103, and an outlet of the second expansion valve 105 is connected with the inlet of the heat conducting element 2. It can be understood that the first expansion valve 104 is arranged on a branch where the evaporator 103 is located, and the second expansion valve 105 is arranged on a branch where the heat conducting element 2 is located.

In an embodiment, a process of the passenger compartment refrigeration loop is as follows. The first expansion valve 104 is closed and the second expansion valve 105 is opened. The refrigerant is pressurized by the compressor 101 and changes into a high-pressure gaseous refrigerant. After the heat exchange between the high-pressure gaseous refrigerant and an external environment through the outdoor condenser 102, the high-pressure gaseous refrigerant changes into a high-pressure liquid refrigerant (which dissipates heat outside the passenger compartment). The high-pressure liquid refrigerant changes into a low-pressure liquid refrigerant after passing through the first expansion valve 104, and then changes into a low-pressure gaseous refrigerant (which absorbs heat from the passenger compartment) after passing through the evaporator 103 installed in the vehicle passenger compartment. The low-pressure gaseous refrigerant flows into the compressor 101.

According to some embodiments of the present disclosure, a process of the battery refrigeration loop is as follows. The first expansion valve 104 and the first solenoid valve 109 are closed, the second expansion valve 105 and the third expansion valve 110 are opened, and the refrigerant is pressurized by the compressor 101 and changes into a high-pressure gaseous refrigerant. After the heat exchange between the high-pressure gaseous refrigerant and the passenger compartment through the indoor condenser 108, the high-pressure gaseous refrigerant changes into a high-pressure liquid refrigerant (which absorbs heat from the passenger compartment). The high-pressure liquid refrigerant changes into a low-pressure liquid refrigerant after passing through the outdoor condenser 102 and the second expansion valve 105. The low-pressure liquid refrigerant then changes into a low-pressure gaseous refrigerant (which absorbs heat from the battery pack of the power battery 3) after passing through the heat conducting element 2. The low-pressure gaseous refrigerant flows into the compressor 101.

In the present disclosure, the vehicle thermal management system can not only cool down the power battery 3, but also cool the passenger compartment, thereby improving the applicability and comfort of the power vehicle.

Figures 2, 3:
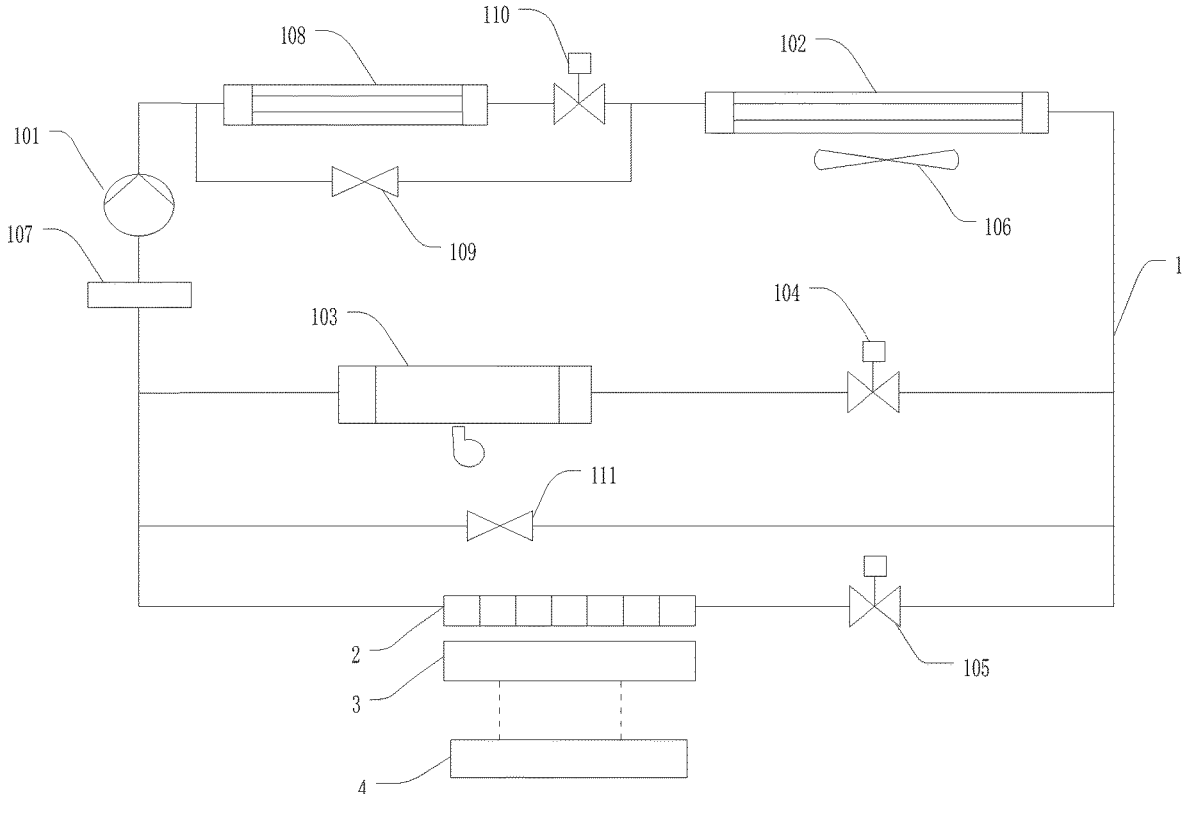
FIG. 2 is a schematic structural diagram of a vehicle thermal management system according to another embodiment of the present disclosure.
FIG. 3 is a block diagram of an electric vehicle according to an embodiment of the present disclosure.

In an embodiment, as shown in FIG. 2, the vehicle air conditioning system 1 further includes an electronic fan 106 installed on the vehicle body and opposite to the outdoor condenser 102. It can be understood that, the electronic fan 106 is arranged opposite to the outdoor condenser 102. The electronic fan 106 assists the heat convection between the outdoor condenser 102 and the external environment, which is conducive to accelerating the transition of the state of the refrigerant in the outdoor condenser 102. Therefore, the arrangement of the electronic fan 106 improves the cooling and heating effects of the vehicle air conditioning system 1.

In an embodiment, as shown in FIG. 2, the vehicle air conditioning system 1 further includes a liquid collector 107. An inlet of the liquid collector 107 is connected with the outlet of the heat conducting element 2 and the outlet of the evaporator 103. An outlet of the liquid collector 107 is connected with the inlet of the compressor 101. It can be understood that, the liquid collector 107 performs the gas-liquid separation of the refrigerant to ensure that the refrigerant entering the compressor 101 is all in the gaseous state. Therefore, the arrangement of the liquid collector 107 ensures the cooling and heating effects of the vehicle air conditioning system 1, and also extends the service life of the vehicle air conditioning system 1.

In an embodiment, as shown in FIG. 2, the vehicle air conditioning system 1 further includes an indoor condenser 108, a first solenoid valve 109, and a third expansion valve 110. An inlet of the indoor condenser 108 and an inlet of the first solenoid valve 109 are both connected with the outlet of the compressor 101, and an outlet of the first solenoid valve 109 is connected with the inlet of the outdoor condenser 102. An outlet of the indoor condenser 108 is connected with the inlet of the outdoor condenser 102 through the third expansion valve 110.

The compressor 101, the indoor condenser 108, the outdoor condenser 102, and the heat conducting element 2 form a first passenger compartment heating loop. The first passenger compartment heating loop absorbs the heat from the power battery 3 through a refrigerant in the heat conducting element 2 and transfers the absorbed heat to the indoor condenser 108 through the compressor 101, then heats the passenger compartment through the indoor condenser 103 arranged in the passenger compartment. It can be understood that, a branch where the first solenoid valve 109 is located is in parallel with a branch where the indoor condenser 108 and the third expansion valve 110 are located. According to some embodiments of the present disclosure, when the battery refrigeration loop or the passenger compartment refrigeration loop operates in the vehicle thermal management system, the first solenoid valve 109 is opened and the third expansion valve 110 is closed. When the first passenger compartment heating loop or a second passenger compartment heating loop described below operates in the vehicle thermal management system, the first solenoid valve 109 is closed and the third expansion valve 110 is opened.

In an embodiment, when the temperature of the external environment is low, the heating effect and heating efficiency of the compressor 101 alone to the passenger compartment are poor. In this case, the first passenger compartment heating loop is required to operate. A process of the first passenger compartment heating loop is as follows. The refrigerant is pressurized by the compressor 101 and changes into a high-pressure gaseous refrigerant. After the heat exchange between the high-pressure gaseous refrigerant and the passenger compartment through the indoor condenser 108, the high-pressure gaseous refrigerant changes into a high-pressure liquid refrigerant (which absorbs the heat from the passenger compartment). The high-pressure liquid refrigerant changes into a low-pressure liquid refrigerant after passing through the second expansion valve 105. The low-pressure liquid refrigerant then flows into the heat conducting element 2 through the outdoor condenser 102 and the second expansion valve 105. The refrigerant in the heat conducting element 2 absorbs heat released by the power battery 3. The refrigerant that has absorbed the heat flows into the compressor 101. According to some embodiments of the present disclosure, when the temperature of the external environment is extremely low, the first passenger compartment heating loop and the self-heating circuit 4 both operate, and the power battery 3 realizes high-frequency alternating charging and discharging for self-heating through the self-heating circuit 4 in the battery self-heating loop. In this case, the amount of heat absorbed by the refrigerant from the power battery 3 increases, further improving the effect of heating the passenger compartment.

In the first passenger compartment heating loop, the refrigerant may absorb heat from the external environment by the outdoor condenser 102, and may also absorb the heat released by the power battery 3, so that the vehicle air conditioning system 1 can still be kept in a high efficiency range for heating, which expands the temperature adaptability of the vehicle air conditioning system 1, and further improves the energy utilization of the power battery.

In an embodiment, as shown in FIG. 2, the vehicle air conditioning system 1 further includes a second solenoid valve 111. An inlet of the second solenoid valve 111 is connected with the outlet of the outdoor condenser 102, and an outlet of the second solenoid valve 111 is connected with the inlet of the compressor 101. The compressor 101, the indoor condenser 108, the third expansion valve 110, the outdoor condenser 102, and the second solenoid valve 111 form a second passenger compartment heating loop, and the second passenger compartment heating loop heats the passenger compartment through the indoor condenser 108 arranged in the passenger compartment. It can be understood that a branch where the second solenoid valve 111 is located is in parallel with the branch where the evaporator 103 is located and the branch where the heat conducting element 2 is located.

In an embodiment, a process of the second passenger compartment heating loop is as follows. The refrigerant is pressurized by the compressor 101 and changes into a high-pressure gaseous refrigerant. After the heat exchange between the high-pressure gaseous refrigerant and the passenger compartment through the indoor condenser 108, the high-pressure gaseous refrigerant changes into a high-pressure liquid refrigerant (which dissipates heat to the passenger compartment). The high-pressure liquid refrigerant changes into a low-pressure liquid refrigerant after passing through the second expansion valve 105. The low-pressure liquid refrigerant flows into the compressor 101 through the second solenoid valve 111 after absorbing the heat from the external environment through the outdoor condenser 102. When the second passenger compartment heating loop operates, the temperature of the external environment is not very low, and does not affect the self-heating efficiency of the vehicle air conditioning system 1.

To sum up, the vehicle thermal management system in the present disclosure can select a heating mode according to the temperature of the external environment, can operate under different temperature conditions, and achieves a higher heating efficiency.

In an embodiment, as shown in FIG. 1, the vehicle air conditioning system 1 further includes a heater 112 arranged on the vehicle body and configured to heat a vehicle passenger compartment. It can be understood that, the vehicle battery thermal management system can realize the cooling of the passenger compartment and the cooling down of the power battery 3, and the heater 112 can heat the vehicle passenger compartment through its own heating effect. When the heater 112 heats the passenger compartment, neither the battery refrigeration loop nor the passenger compartment refrigeration loop operates. According to some embodiments of the present disclosure, the heater 112 may be an air heater integrated in the vehicle air conditioning system 1, or a coolant heating loop. The coolant heating loop is sequentially connected in series with a pump, the heater 112 and a heating chip. A coolant is heated by the heater 112 and then flows through the heating chip to raise the temperature of the passenger compartment, thereby realizing the effect of heating the passenger compartment.

Referring to FIG. 3, an embodiment of the present disclosure further provides an electric vehicle 20, including the vehicle thermal management system 10.

The foregoing descriptions are merely some embodiments of the present disclosure, but are not to limit the present disclosure. Any modification, equivalent replacement, or improvement made within the spirit and principle of the present disclosure shall fall within the protection scope of the present disclosure.

What is claimed is:

1. A vehicle thermal management system, comprising a vehicle air conditioning system and a vehicle battery thermal management system, wherein the vehicle battery thermal management system comprises a heat conducting element connected to the vehicle air conditioning system and a self-heating circuit connected to a vehicle power battery, wherein the heat conducting element, a compressor of the vehicle air conditioning system, and an outdoor condenser of the vehicle air conditioning system form a battery refrigeration loop, and the battery refrigeration loop absorbs heat from the vehicle power battery through a refrigerant in the heat conducting element to cool down the vehicle power battery; and the self-heating circuit and the vehicle power battery form a battery self-heating loop, and the self-heating circuit is configured to control the vehicle power battery to perform high-frequency alternating charging and discharging for self-heating in the battery self-heating loop; and the vehicle air conditioning system comprises the compressor, the outdoor condenser, and an evaporator, wherein an outlet of the compressor is connected with an inlet of the outdoor condenser, and an outlet of the outdoor condenser is connected with an inlet of the evaporator and an inlet of the heat conducting element;

an outlet of the evaporator and an outlet of the heat conducting element are connected with an inlet of the compressor; and the compressor, the outdoor condenser, and the evaporator form a passenger compartment refrigeration loop, and the passenger compartment refrigeration loop cools a passenger compartment through the evaporator in the passenger compartment.

2. The vehicle thermal management system according to claim 1, wherein the vehicle air conditioning system further comprises a first expansion valve and a second expansion valve for reducing refrigerant pressure; an inlet of the first expansion valve and an inlet of the second expansion valve are both connected with the outlet of the outdoor condenser; and an outlet of the first expansion valve is connected with the inlet of the evaporator, and an outlet of the second expansion valve is connected with the inlet of the heat conducting element.

3. The vehicle thermal management system according to claim 1, wherein the vehicle air conditioning system further comprises an electronic fan installed on a vehicle body and opposite to the outdoor condenser.

4. The vehicle thermal management system according to claim 1, wherein the vehicle air conditioning system further comprises a liquid collector; an inlet of the liquid collector is connected with the outlet of the heat conducting element and the outlet of the evaporator; and an outlet of the liquid collector is connected with the inlet of the compressor.

5. The vehicle thermal management system according to claim 1, wherein the vehicle air conditioning system further comprises an indoor condenser, a first solenoid valve, and a third expansion valve, wherein an inlet of the indoor condenser and an inlet of the first solenoid valve are both connected with the outlet of the compressor, and an outlet of the first solenoid valve is connected with the inlet of the outdoor condenser;

an outlet of the indoor condenser is connected with the inlet of the outdoor condenser through the third expansion valve;

the compressor, the indoor condenser, the outdoor condenser, and the heat conducting element form a first passenger compartment heating loop; and the first passenger compartment heating loop absorbs the heat from the vehicle power battery through the refrigerant in the heat conducting element, transfers the absorbed heat to the indoor condenser through the compressor, and heats the passenger compartment through the indoor condenser in the passenger compartment.

6. The vehicle thermal management system according to claim 5, wherein the vehicle air conditioning system further comprises a second solenoid valve, wherein an inlet of the second solenoid valve is connected with the outlet of the outdoor condenser, and an outlet of the second solenoid valve is connected with the inlet of the compressor; and the compressor, the indoor condenser, the third expansion valve, the outdoor condenser, and the second solenoid valve form a second passenger compartment heating loop, and the second passenger compartment heating loop heats the passenger compartment through the indoor condenser.

7. The vehicle thermal management system according to claim 1, wherein the vehicle air conditioning system further comprises a heater disposed on the vehicle body and configured to heat the passenger compartment.

8. The vehicle thermal management system according to claim 1, wherein the heat conducting element comprises a cooling plate integrated in the vehicle power battery.

9. An electric vehicle, comprising a vehicle thermal management system comprising a vehicle air conditioning system and a vehicle battery thermal management system, wherein the vehicle battery thermal management system comprises a heat conducting element connected to the vehicle air conditioning system and a self-heating circuit connected to a vehicle power battery, wherein the heat conducting element, a compressor of the vehicle air conditioning system, and an outdoor condenser of the vehicle air conditioning system form a battery refrigeration loop, and the battery refrigeration loop absorbs heat from the vehicle power battery through a refrigerant in the heat conducting element to cool down the vehicle power battery; and the self-heating circuit and the vehicle power battery form a battery self-heating loop, and the self-heating circuit is configured to control the vehicle power battery to perform high-frequency alternating charging and discharging for self-heating in the battery self-heating loop; and the vehicle air conditioning system comprises the compressor, the outdoor condenser, and an evaporator, wherein an outlet of the compressor is connected with an inlet of the outdoor condenser, and an outlet of the outdoor condenser is connected with an inlet of the evaporator and an inlet of the heat conducting element;

an outlet of the evaporator and an outlet of the heat conducting element are connected with an inlet of the compressor; and the compressor, the outdoor condenser, and the evaporator form a passenger compartment refrigeration loop, and the passenger compartment refrigeration loop cools a passenger compartment through the evaporator in the passenger compartment.

10. The electric vehicle according to claim 9, wherein the vehicle air conditioning system further comprises a first expansion valve and a second expansion valve for reducing refrigerant pressure; an inlet of the first expansion valve and an inlet of the second expansion valve are both connected with the outlet of the outdoor condenser; and an outlet of the first expansion valve is connected with the inlet of the evaporator, and an outlet of the second expansion valve is connected with the inlet of the heat conducting element.

11. The electric vehicle according to claim 9, wherein the vehicle air conditioning system further comprises an electronic fan installed on a vehicle body and opposite to the outdoor condenser.

12. The electric vehicle according to claim 9, wherein the vehicle air conditioning system further comprises a liquid collector; an inlet of the liquid collector is connected with the outlet of the heat conducting element and the outlet of the evaporator; and an outlet of the liquid collector is connected with the inlet of the compressor.

13. The electric vehicle according to claim 9, wherein the vehicle air conditioning system further comprises an indoor condenser, a heater, a first solenoid valve, a second solenoid valve, and a third expansion valve, wherein an inlet of the indoor condenser and an inlet of the first solenoid valve are both connected with the outlet of the compressor, and an outlet of the first solenoid valve is connected with the inlet of the outdoor condenser;

an outlet of the indoor condenser is connected with the inlet of the outdoor condenser through the third expansion valve;

an inlet of the second solenoid valve is connected with the outlet of the outdoor condenser, and an outlet of the second solenoid valve is connected with the inlet of the compressor;

the compressor, the indoor condenser, the outdoor condenser, and the heat conducting element form a first passenger compartment heating loop, the first passenger compartment heating loop absorbs the heat from the vehicle power battery through the refrigerant in the heat conducting element, transfers the absorbed heat to the indoor condenser through the compressor, and heats the passenger compartment through the indoor condenser in the passenger compartment;

the compressor, the indoor condenser, the third expansion valve, the outdoor condenser, and the second solenoid valve form a second passenger compartment heating loop, and the second passenger compartment heating loop heats the passenger compartment through the indoor condenser;

the heater is disposed on the vehicle body and configured to heat the passenger compartment; and the heat conducting element comprises a cooling plate integrated in the vehicle power battery.

* * * * *